(12) United States Patent
Cannon (10) Patent No.: US 6,474,618 B1
(45) Date of Patent: Nov. 5, 2002

(54) ELASTOMERIC MOUNTING

(75) Inventor: Peter Richard Andrew Cannon, Littlehampton (GB)

(73) Assignee: Trelleborg AB, Trelleborg (SE)

( * ) Notice: Subject to any disclaimer, the term of this patent is extended or adjusted under 35 U.S.C. 154(b) by 0 days.

(21) Appl. No.: 09/700,192

(22) PCT Filed: May 4, 1999

(86) PCT No.: PCT/GB99/01370

§ 371 (c)(1),
(2), (4) Date: Jan. 2, 2001

(87) PCT Pub. No.: WO99/58871

PCT Pub. Date: Nov. 18, 1999

(30) Foreign Application Priority Data

May 12, 1998 (GB) .............................................. 9809996

(51) Int. Cl.$^7$ ................................................. F16M 7/00
(52) U.S. Cl. ........................ 248/560; 248/638; 248/618
(58) Field of Search ................................ 248/638, 560, 248/618, 622, 632, 634; 211/49.1

(56) References Cited

FOREIGN PATENT DOCUMENTS

| DE | 27 19 925 | 11/1977 |
|----|-----------|---------|
| FR | 1 219 468 | 5/1960 |
| FR | 1 225 243 A | 6/1960 |
| GB | 508 702 A | 7/1939 |
| GB | 718 605 A | 11/1954 |

*Primary Examiner*—Korie Chan
*Assistant Examiner*—Ingrid Weinhold
(74) *Attorney, Agent, or Firm*—Burns Doane Swecker & Mathis LLP (57) ABSTRACT

An elastomeric mounting module (1) suitable for use as one of a pair of modules for forming an elastomeric mounting assembly (20) comprises two rigid end members (2, 3) of L-shape section and an element (4) of elastomeric material extending between and bonded to inwardly facing surfaces (10, 11) of the end members, respective bonded surface zones of the two rigid end members being offset at least in part as considered in the direction of normal compression loading and in a transverse direction perpendicular to said loading direction.

36 Claims, 7 Drawing Sheets

ELASTOMERIC MOUNTING

This invention relates to an elastomeric mounting and in particular, though not exclusively, to an elastomeric mounting adapted to accommodate a high degree of deflection in a direction of normal compression loading.

It relates also, though not exclusively, to an elastomeric mounting which preferably allows relatively unrestricted movement in at least one direction in a plane perpendicular to the direction of normal compression loading.

The invention has as one object the provision of an elastomeric mounting which has an improved compression deflection capability and which potentially is of lower cost than established designs of mountings. Preferably the elastomeric mounting is effective also to dampen the transmission of acoustic frequency vibrations.

According to one aspect of the invention an elastomeric mounting module comprises two rigid end members, each end member being substantially of L-shape in cross-section and oriented with two inwardly facing surfaces of the L-shape generally facing towards inwardly facing surfaces of the other end member, and an element of elastomeric material extending between and bonded to said inwardly facing surfaces, respective bonded surfaces of said end members being offset at least in part as considered in the direction of normal compression loading and in a traverse direction perpendicular to said loading direction.

It is envisaged that preferably the two inwardly facing, bonded surfaces of an end member will lie relative to one another at an angle in the range 80° to 115°, more preferably in the range 85° to 100°. The bonded surfaces of each end member may lie in planes substantially perpendicular relative to one another.

The two end members may be identical, so helping to minimise production costs.

Preferably the respective bonded surfaces are partly overlapped as viewed along said direction of normal compression loading. Viewed in a first transverse direction perpendicular to the compression loading direction said bonded surfaces preferably are spaced apart, at least in the absence of compression loading. Viewed in a second transverse direction perpendicular to said first transverse direction the elastomeric element preferably is substantially free from direct compression loading at least at normal operating loads.

The relative shapes of the module parts and their sizes preferably are selected so that during initial loading in said direction of compression the elastomeric element is loaded in shear and compression, in combination.

The elastomeric element preferably is bereft of any internal reinforcement or interleaves. Preferably in at least one transverse direction it is free from either internal or external structure that might inhibit its freedom to bulge, at least until any buffer action occurs under extreme or shock load conditions.

Preferably, but not necessarily, the elastomeric element is of a substantially solid shape. Preferably it is bereft of cavities, and more preferably it is bereft of any openings extending therethrough in a direction perpendicular to the cross-sectional plane of said L shape.

Preferably the elastomeric material extends wholly into the corner space region between the two inwardly facing surfaces of an end member. It is believed that this usefully assists in deadening the transmission of sound through the mounting.

Unbonded end surfaces of the rigid members may be provided with location means, such as tapped holes, to allow rigid members of one module to be located relative to corresponding rigid members of a second module.

Tie bars may be provided to secure one pair of end members in proximity to one another, e.g. in direct back-to-back contact, and another to secure the other pair at a prescribed spacing.

The invention provides also an elastomeric mounting assembly which is comprised by two or more elastomeric mounting modules secured in position relative to one another. The assembly may be secured to supported or supporting structure which is utilised to maintain rigid members of the modules in a predetermined spatial relationship.

The assembly may comprise modules having elastomeric elements of different sizes and/or of different volumes. Preferably none of the elastomeric elements of the assembly have a volume greater than 15 litres.

Preferably the same cross-sectional size and shape of rigid end member is used in two or more modules of different sizes or which have elastomeric elements of different volumes.

Embodiments of the invention are now described by way of example with reference to the accompanying Drawings wherein.

Figure 1:
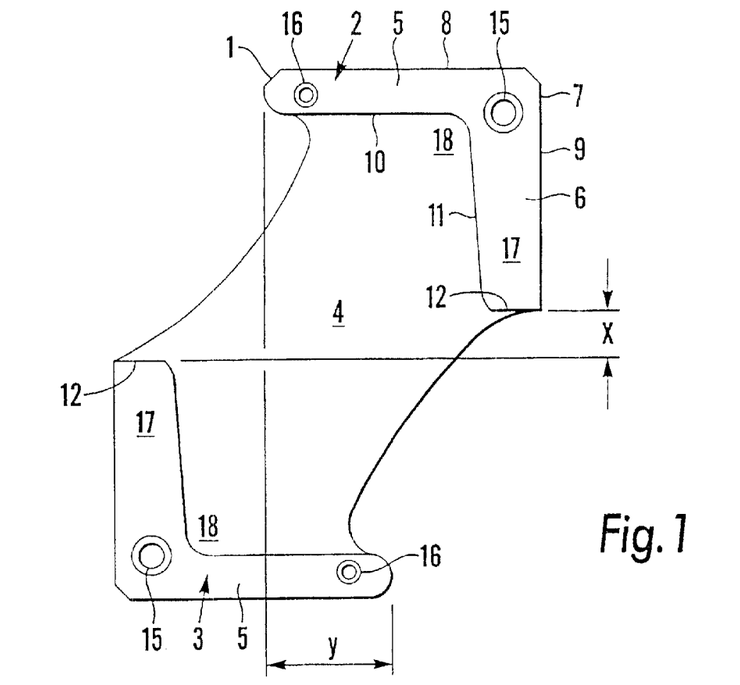
FIGS. 1 to 3 show end, side and top views of a mounting module of the invention.
Figure 2:
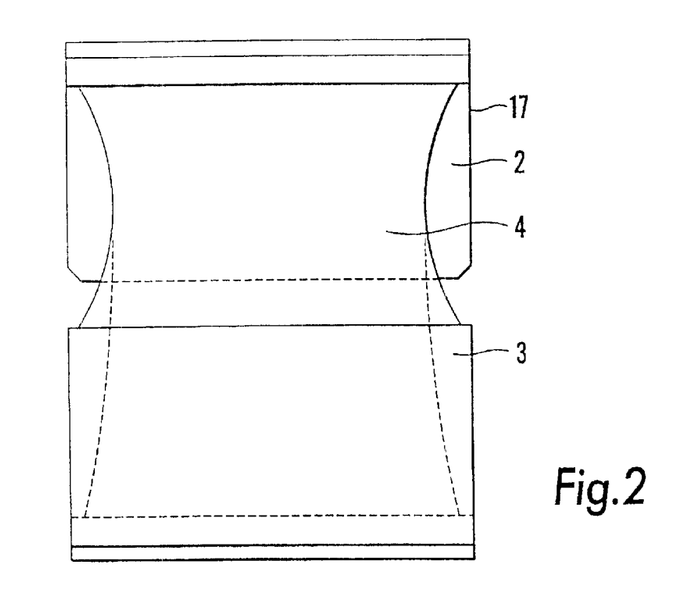
Figure 3:
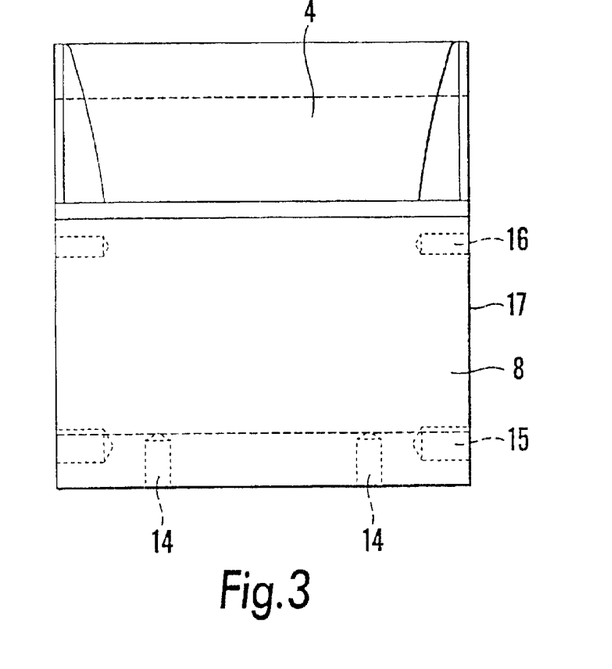

A modular type elastomeric mounting 1 shown in FIGS. 1 to 3 comprises two identical rigid, metal end members 2, 3 bonded to and interconnected by an elastomeric element 4.

Each end member 2, 3 has a right angled L shape in cross section as shown in FIG. 1 and has two limb portions 5, 6 of equal length.

One limb 5 is of uniform thickness. The other limb 6 is slightly tapered, to reduce in thickness away from a corner region 7.

Outer faces 8, 9 of the limbs 5, 6 are at right angles.

The elastomeric element 4 extends generally diagonally between the inwardly facing end member surfaces 10, 11 to which it is bonded, as viewed in FIG. 1. Element 4 is bonded to substantially the whole of each face 10, 11 and to the far end surface 12 of each tapered limb 6. Element 4 therefore fully occupies the corner space region 18 between the two inwardly facing surfaces 10,11 of each end member.

The diagonal length of the elastomeric element 4 is sufficient to vertically space apart the end surfaces 12 of the tapered limbs 6 as shown by distance X of FIG. 1. This ensures that when the limbs 6 move transversely towards one another the elastomeric element is loaded primarily only in shear at least during the initial stages of that movement.

The diagonal length and shape of the elastomeric element is selected to create a part overlap of the horizontal limbs 5 when viewed in a vertical direction and as shown by the distance Y of FIG. 1.

The outer faces 8 of the limbs 5 are provided with plain holes 14 for attachment to supporting or supported structure.

The end faces 17 of the end members 2, 3 also have tapped and plain holes 15, 16 for a purpose described below in the context of an elastomeric mounting assembly which comprises a plurality of the modular mountings 1.

Figure 4:
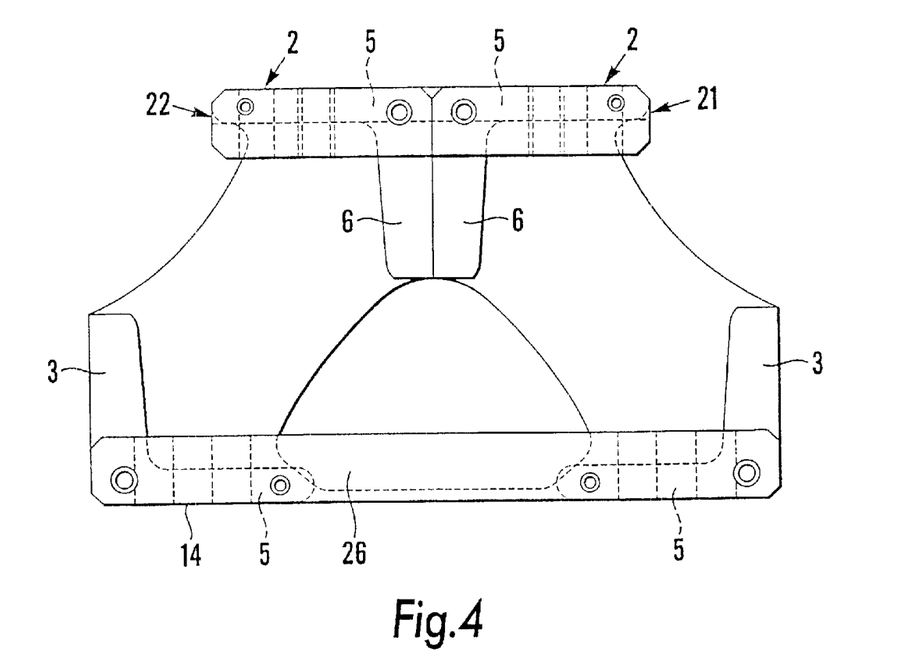
FIGS. 4 to 6 show end, side and top views of a mounting assembly of the invention.
Figure 5:
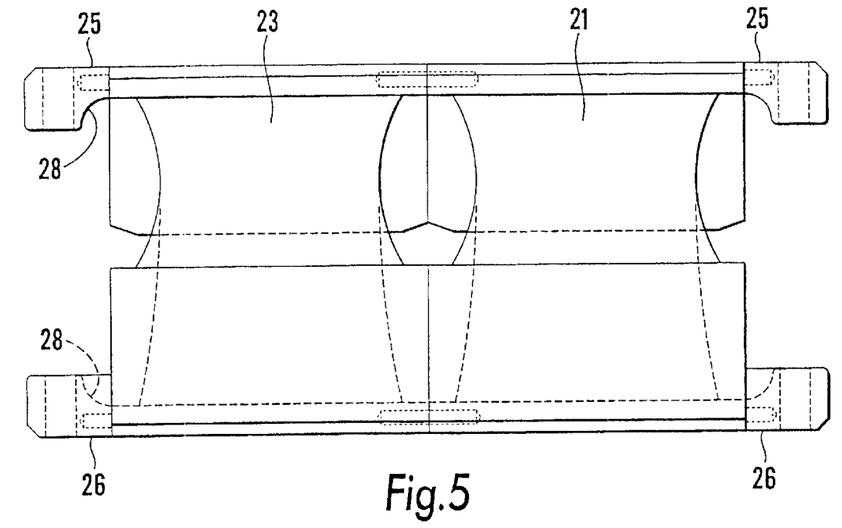
Figure 6:
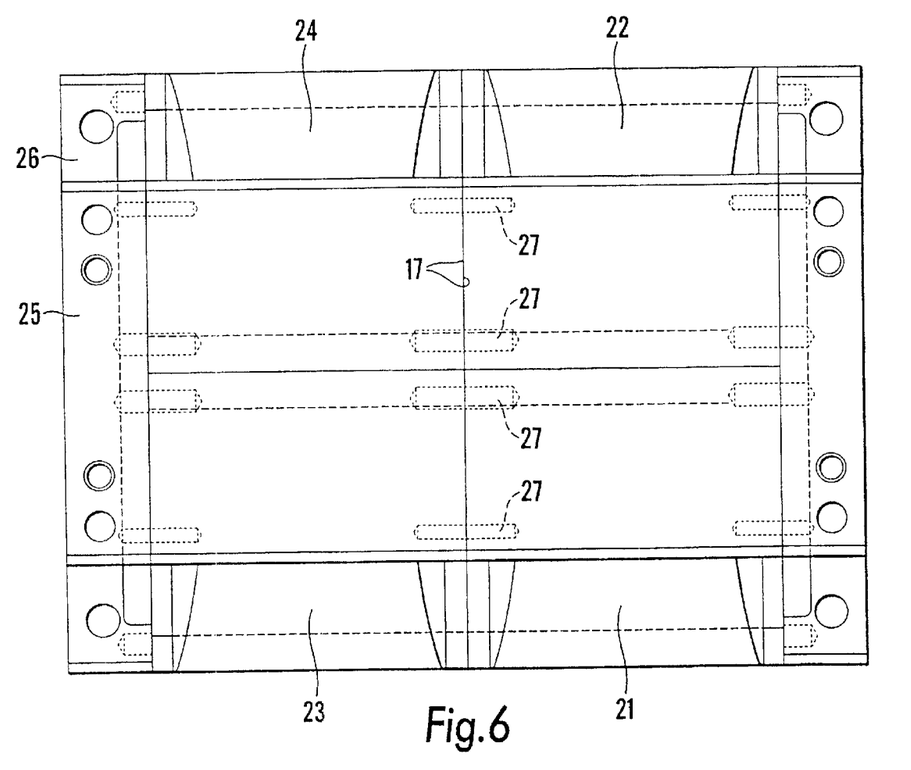

An elastomeric mounting assembly 20 shown in FIGS. 4 to 6 comprises four of the modular mountings 1 of FIGS. 1 to 3. The four mountings 21–24 are positioned in pairs, the two pairs lying side-by-side with end members 2,3 aligned, and the two mountings of each pair being in a back-to-back configuration with a pair of tapered limbs 6 of upper end members 2 adjacent one another and the associated limbs 5 being co-planar.

Limbs 6 of a back-to-back pair of adjacent upper end members 2 are held together by an upper end tie bar 25 and a pin which extends through the bar into the holes 15,16. Limbs 5 of lower end members 3 similarly are maintained spaced by a lower tie bar 26.

The two back-to-back pairs of mountings 21–24 are held in alignment by dowel pins 27 in confronting end faces 17 of the end members 2,3. Axial separation of the pairs of mountings is resisted by the supported and supporting structure to which the mountings are secured with the aid of the plain holes 14.

Inwardly facing surfaces 28 of the upper and lower tie bars 25,26 are curved to provide preferential resistance to bulging movement of the elastomeric elements. The curvature is selected in relation to desired load-deflection characteristics of the mounting assembly at conditions under which the elastomer bulges axially, which is sideways as viewed in FIG. 5.

Figure 7:
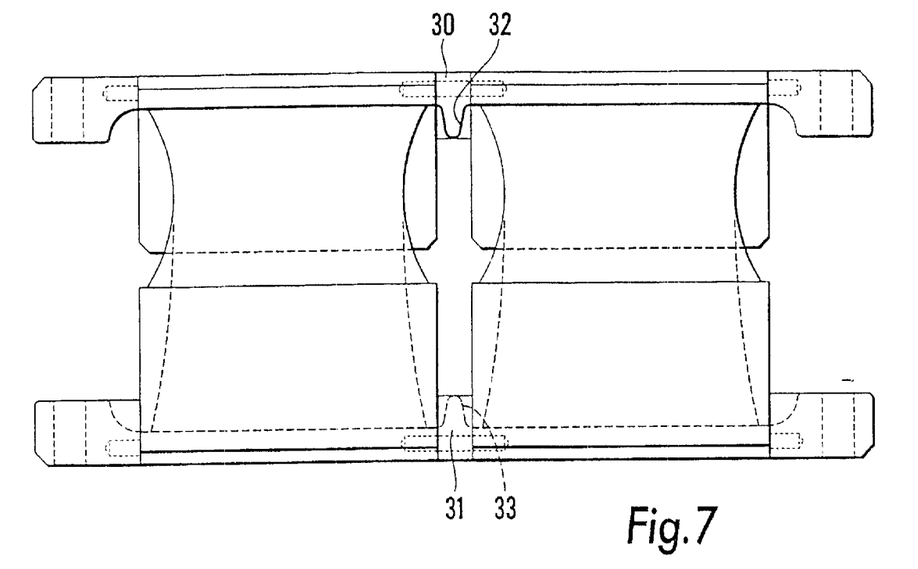
FIGS. 7 & 8 show side and top views of another mounting assembly of the invention.
Figure 8:
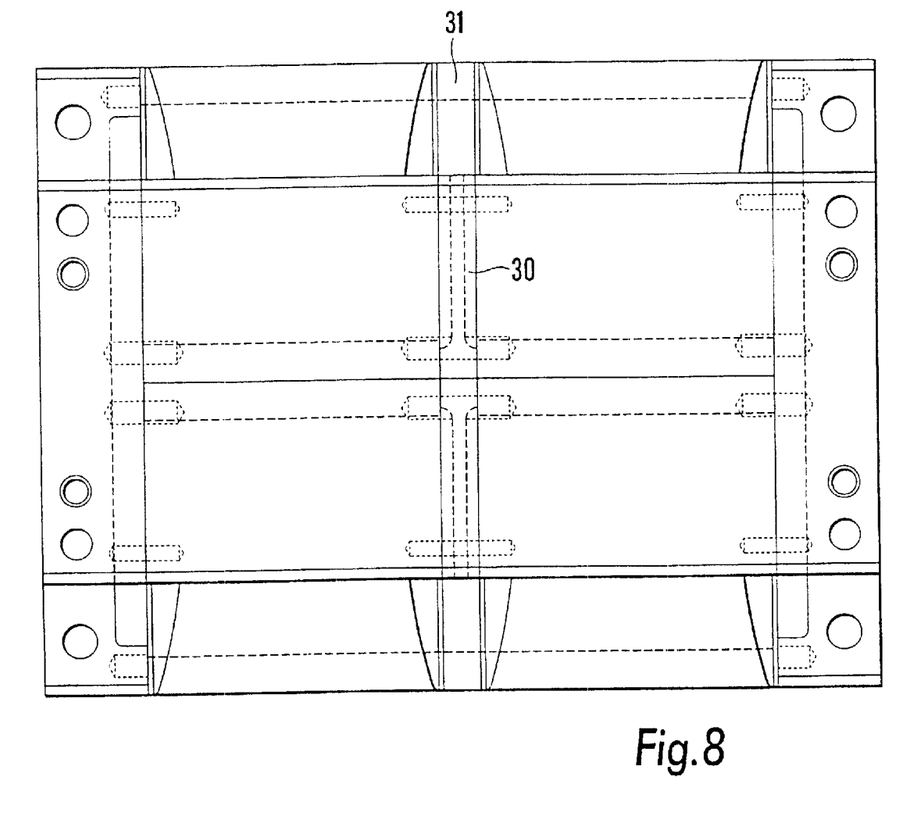

FIGS. 7 and 8 show a variation of the construction of FIGS. 4 to 6. Intermediate tie bars 30,31 are positioned between the pairs of mountings 21–24. The tie bars 30,31 have curved buffer surfaces 32,33 shaped to aid tuning of the mounting to the desired load-deflection characteristics.

Figure 9:
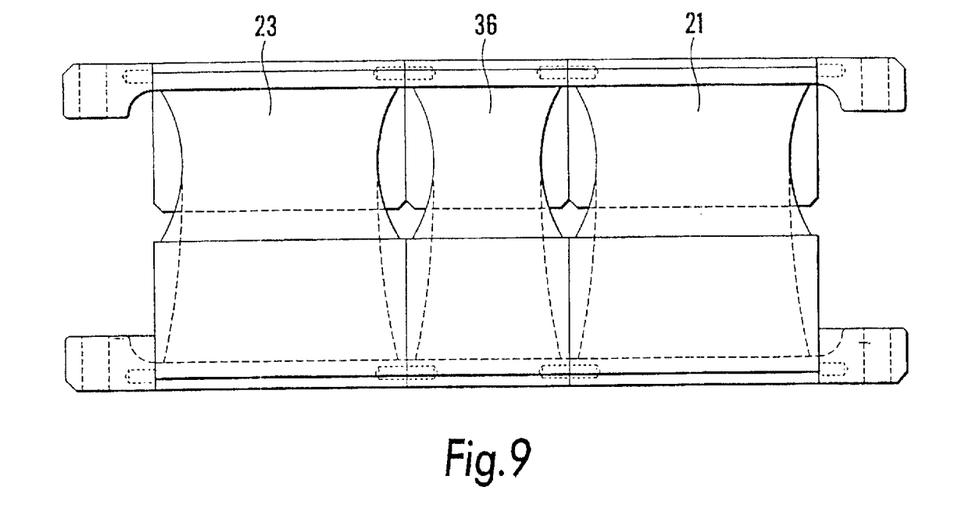
FIGS. 9 & 10 show side and top views of yet another assembly of the invention.
Figure 10:
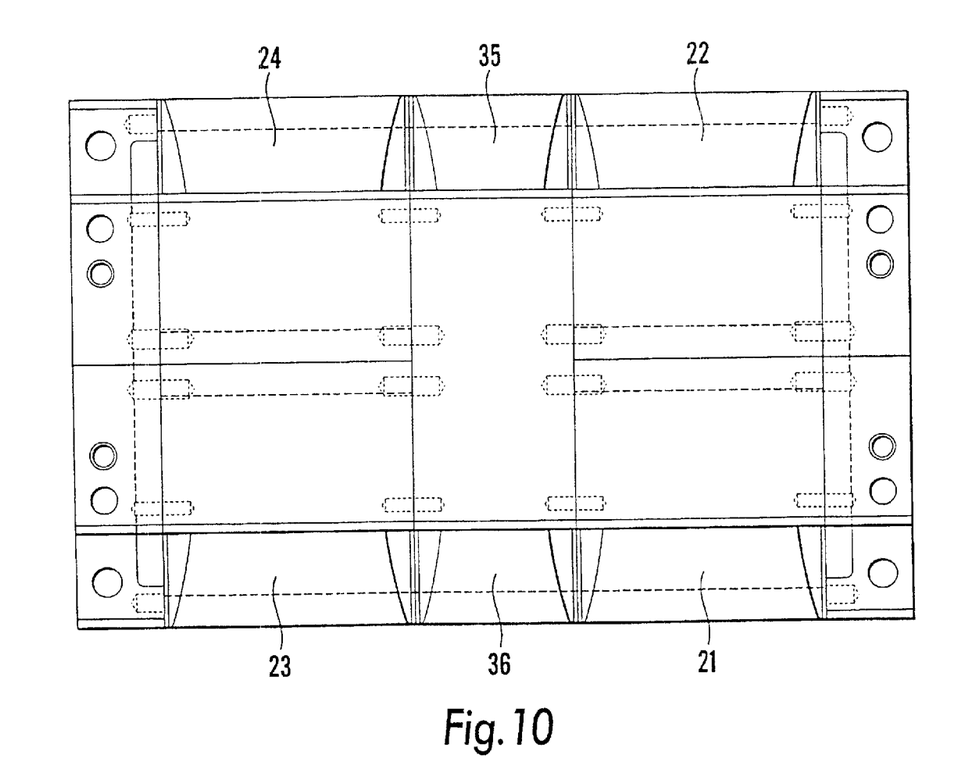

FIGS. 9 and 10 show another variation of the construction of FIGS. 4 to 6. This variation has an additional pair 35,36 of mounting modules provided between the two pairs of mountings 21–24. The axial length of the mountings 35,36, as viewed in the horizontal direction of the Figures, is less than that of the mountings 21–24.

Figure 11:
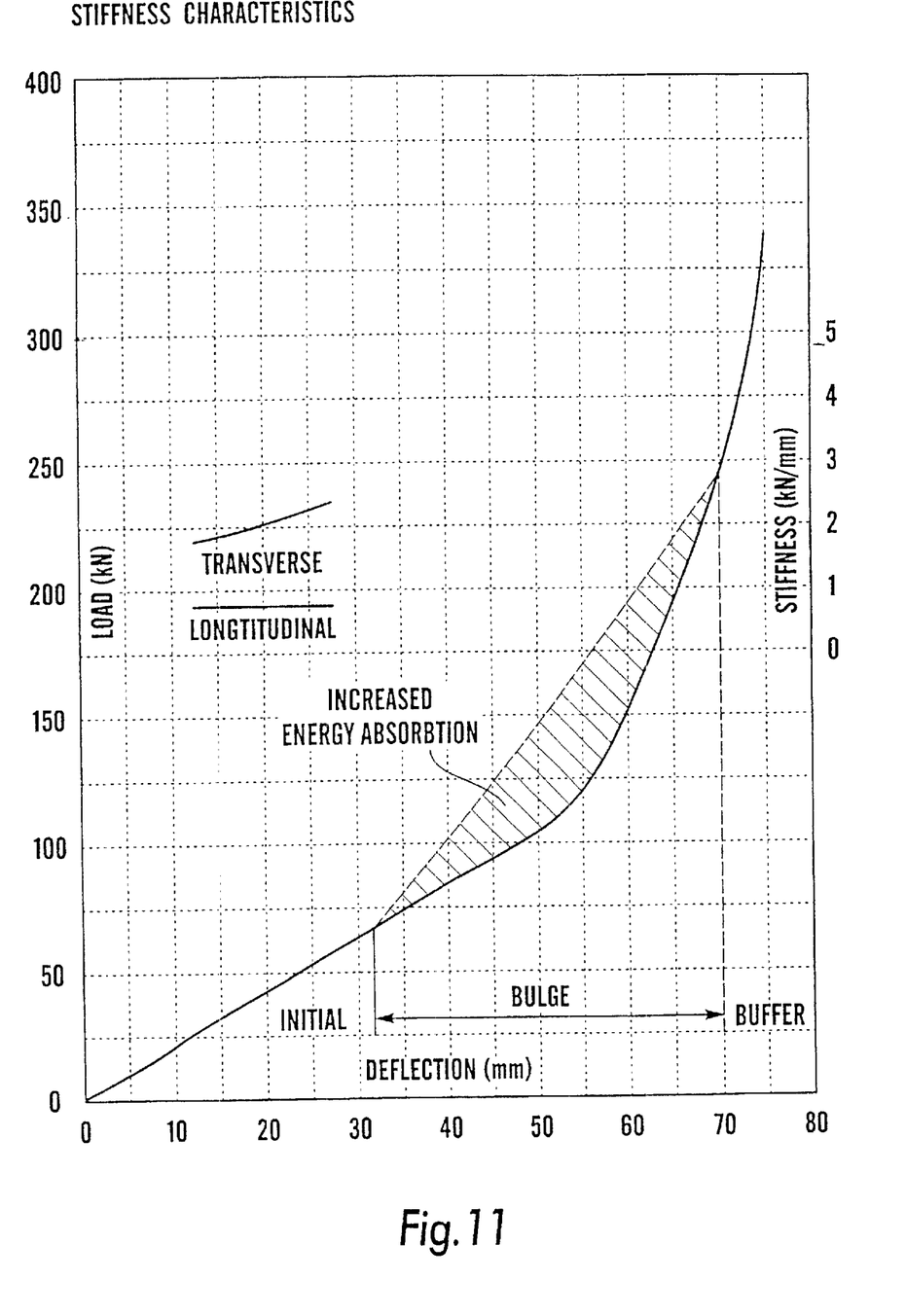
FIG. 11 shows a vertical load-deflection curve.
Figure 12A:
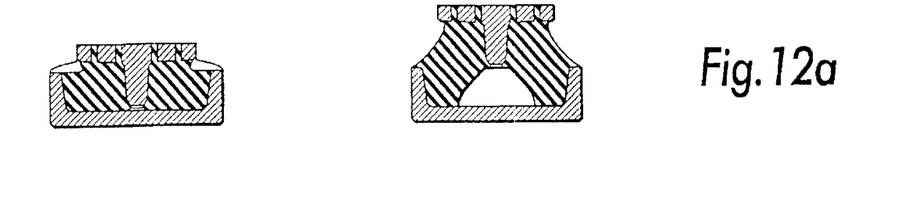
FIGS. 12a–12e shows end views of five design variations each unloaded and fully loaded vertically.
Figure 12B:
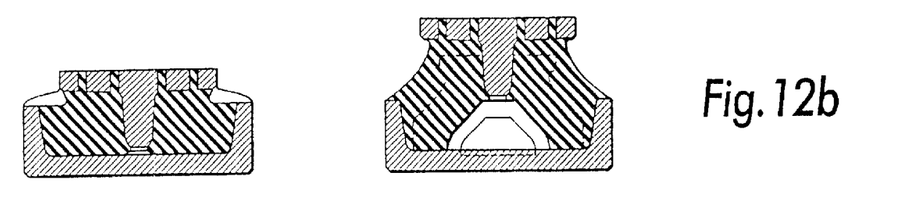
Figure 12C:
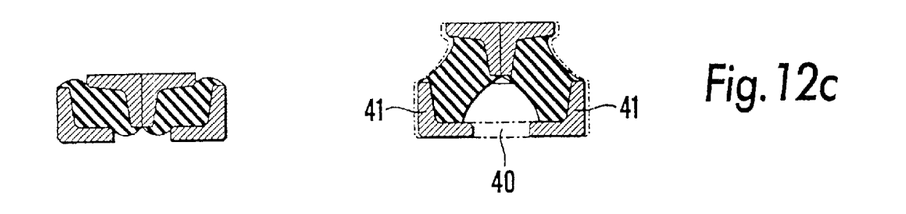
Figure 12D:
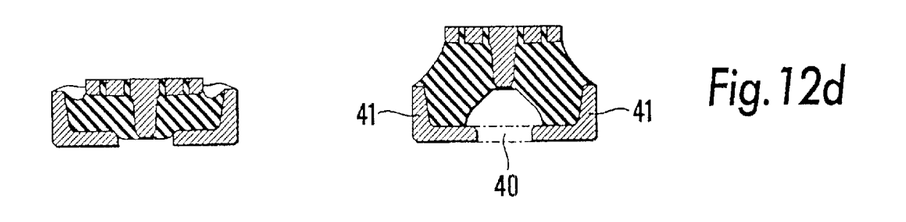
Figure 12E:
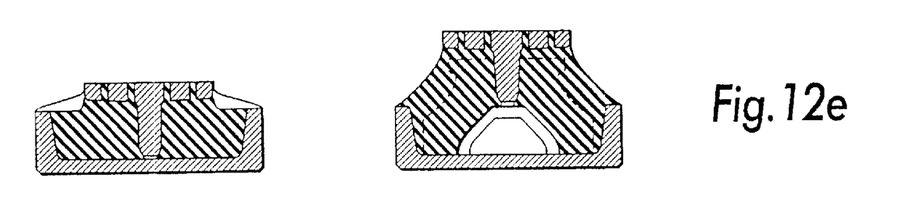

FIG. 11 shows a sample of a vertical load-deflection curve for the mountings of the invention. The initial stage relates to vertical shear and compression loading. The bulge stage relates to axial, longitudinal extension (side to side direction of FIG. 2) and in the buffer stage the elastomeric material at one module presses against the elastomeric elements of neighbouring modules and any axial buffer surfaces of the tie bars.

FIGS. 12a–12e shows a selection of design alternatives each in unloaded and fully loaded states. Alternatives 12c and 12d have a longitudinally continuous space 40 between the lower end members 41. This allows the mounting to collapse further under vertical load than is possible with the other design alternatives.

What is claimed is:

1. An elastomeric mounting assembly, comprising: at least two elastomeric mounting modules (1) secured in position relative to one another, each of said modules (1) comprising two rigid end members (2,3), each substantially of L-shape in cross-section and an element (4) of elastomeric material extending therebetween and bonded thereto said end members (2,3) having respective bonded surfaces (10,11) which are offset (y,x) at least in part as considered in the direction of normal compression loading and relative to a transverse direction perpendicular to said loading direction, whereby said end member (2,3) is oriented with the two inwardly facing, bonded surfaces (10,11) thereof generally facing towards inwardly facing bonded surfaces (10,11) of the other end member and that unbonded end surfaces of the rigid members comprise location means whereby said rigid members of the module may be located relative to corresponding said rigid members of another said module; and tie bars (25,26) whereby one pair of respective said end members (2) of two said modules (1) may be secured in proximity to one another and the other pair of respective end members (3) may be secured at a prescribed spacing relative to one another.

2. An elastomeric mounting assembly in accordance with claim 1, characterized in that said two inwardly facing bonded surfaces (10,11) of one of the end members (2,3) lie at an angle in the range 80° to 115° relative to one another as considered in the cross-section of said L shape.

3. An elastomeric mounting assembly in accordance with claim 2, characterized in that said angle is in the range 85° to 100°.

4. An elastomeric mounting assembly in accordance with claim 3, characterized in that said bonded surfaces (10,11) of each said end member lie in planes substantially perpendicular relative to one another.

5. An elastomeric mounting assembly in accordance with claim 4, characterized in that said two rigid end members (2,3) are identical.

6. An elastomeric mounting assembly in accordance with claim 5, characterized in that said respective bonded surfaces (10,11) are partly overlapped (y) as viewed along said direction of normal compression loading.

7. An elastomeric mounting assembly in accordance with claim 6, characterized in that said bonded surfaces (10,11) are spaced apart (x), in the absence of compression load, when viewed in a first transverse direction perpendicular to the compression loading direction.

8. An elastomeric mounting assembly in accordance with claim 7, characterized in that when viewed in a second transverse direction perpendicular to said first transverse direction the elastomeric element (4) is substantially free from direct compression loading at normal operating loads.

9. An elastomeric mounting assembly in accordance with claim 8, characterized in that during initial loading in said direction of compression the elastomeric element (4) is subject to a combination of shear and compression.

10. An elastomeric mounting assembly in accordance with claim 9, characterized in that the elastomeric element (4) is bereft of internal reinforcement or interleaves.

11. An elastomeric mounting assembly in accordance with claim 10, characterized in that in at least one transverse direction the elastomeric element (4) is free from additional internal or external structure that might inhibit the freedom of the material to bulge during normal working load conditions.

12. An elastomeric mounting assembly in accordance with claim 11, characterized in that the elastomeric element (4) is of a substantially solid shape.

13. An elastomeric mounting assembly in accordance with claim 12, characterized in that the elastomeric element (4) is bereft of cavities therein.

14. An elastomeric mounting assembly in accordance with claim 13, characterized in that the elastomeric element (4) is bereft of any openings extending therethrough in a direction perpendicular to the cross-sectional plane of said L shape.

15. An elastomeric mounting assembly in accordance with claim 1, characterized in that supported or supporting structure is utilized to maintain said rigid end members of the modules in a predetermined spatial relationship.

16. An elastomeric mounting assembly in accordance with claim 15, further comprising: at said least two modules (1) having elastomeric elements (21–24; 35,36) of different sizes.

17. An elastomeric mounting assembly in accordance with claim 16, further comprising: said at least two modules (1) having elastomeric elements (21–24; 35,36) of different volumes.

18. An elastomeric mounting assembly in accordance with claim 17, characterized in that none of the elastomeric elements has a volume greater than 15 liters.

19. An elastomeric mounting assembly in accordance with claim 18, characterized in that the same size and shape of said rigid end member is used in two modules of different sizes.

20. An elastomeric mounting assembly in accordance with claim 19, characterized in that the same size and shape of said rigid end member is used in two said modules which have said elastomeric elements of different volumes.

21. An elastomeric mounting assembly in accordance with claim 1, characterized in that said bonded surfaces (10,11) of each said end member lie in planes substantially perpendicular relative to one another.

22. An elastomeric mounting assembly in accordance with claim 1, characterized in that said two rigid end members (2,3) are identical.

23. An elastomeric mounting assembly in accordance with claim 1, characterized in that said respective bonded surfaces (10,11) are partly overlapped (y) as viewed along said direction of normal compression loading.

24. An elastomeric mounting assembly in accordance with claim 1, characterized in that said bonded surfaces (10,11) are spaced apart (x), in the absence of compression load, when viewed in a first transverse direction perpendicular to the compression loading direction.

25. An elastomeric mounting assembly in accordance with claim 24, characterized in that when viewed in a second transverse direction perpendicular to said first transverse direction the elastomeric element (4) is substantially free from direct compression loading at normal operating loads.

26. An elastomeric mounting assembly in accordance with claim 1, characterized in that during initial loading in said direction of compression the elastomeric element (4) is subject to a combination of shear and compression.

27. An elastomeric mounting assembly in accordance with claim 1, characterized in that the elastomeric element (4) is bereft of internal reinforcement or interleaves.

28. An elastomeric mounting assembly in accordance with claim 1, characterized in that in at least one transverse direction the elastomeric element (4) is free from additional internal or external structure that might inhibit the freedom of the material to bulge during normal working load conditions.

29. An elastomeric mounting assembly in accordance with claim 1, characterized in that the elastomeric element (4) is of a substantially solid shape.

30. An elastomeric mounting assembly in accordance with claim 1, characterized in that the elastomeric element (4) is bereft of cavities therein.

31. An elastomeric mounting assembly in accordance with claim 1, characterized in that the elastomeric element (4) is bereft of any openings extending therethrough in a direction perpendicular to the cross-sectional plane of said L shape.

32. An elastomeric mounting assembly in accordance with claim 1, further comprising: at said least two modules (1) having elastomeric elements (21–24; 35,36) of different sizes.

33. An elastomeric mounting assembly in accordance with claim 1, further comprising: said at least two modules (1) having elastomeric elements (21–24; 35,36) of different volumes.

34. An elastomeric mounting assembly in accordance with claim 1, characterized in that none of the elastomeric elements has a volume greater than 15 liters.

35. An elastomeric mounting assembly in accordance with claim 1, characterized in that the same size and shape of rigid end member is used in two modules of different sizes.

36. An elastomeric mounting assembly in accordance with claim 1, characterized in that the same size and shape of said rigid end member is used in two said modules which have said elastomeric elements of different volumes.

\* \* \* \* \*